(12) United States Patent
Hukkanen

(10) Patent No.: US 9,822,942 B2
(45) Date of Patent: Nov. 21, 2017

(54) LOW-BEAM HEADLIGHT ELEMENT FOR A VEHICLE

(71) Applicant: LEDIL OY, Salo (FI)

(72) Inventor: Hannu Hukkanen, Turku (FI)

(73) Assignee: LEDIL OY, Salo (FI)

( * ) Notice: Subject to any disclaimer, the term of this patent is extended or adjusted under 35 U.S.C. 154(b) by 0 days.

(21) Appl. No.: 15/034,880

(22) PCT Filed: Apr. 24, 2014

(86) PCT No.: PCT/FI2014/050294
§ 371 (c)(1),
(2) Date: May 6, 2016

(87) PCT Pub. No.: WO2015/071529
PCT Pub. Date: May 21, 2015

(65) Prior Publication Data
US 2016/0281948 A1   Sep. 29, 2016

(30) Foreign Application Priority Data

Nov. 12, 2013   (FI) ...................................... 20136106

(51) Int. Cl.
*F21V 5/04* (2006.01)
*F21S 8/10* (2006.01)
*G02B 3/00* (2006.01)

(52) U.S. Cl.
CPC ....... *F21S 48/1291* (2013.01); *F21S 48/1233* (2013.01); *F21S 48/137* (2013.01);
(Continued)

(58) Field of Classification Search
CPC .. F21S 48/1291; F21S 48/1233; F21S 48/137; F21S 48/1394; F21S 48/12;
(Continued)

(56) References Cited

U.S. PATENT DOCUMENTS 1,321,787 A * 11/1919 Foster .................. G02B 6/0053
                                                         362/339
1,560,793 A * 11/1925 Dunlea ............... F21S 48/1233
                                                         362/339
(Continued)

FOREIGN PATENT DOCUMENTS

DE         3531221         3/1987
EP         1600689         11/2005
(Continued)

OTHER PUBLICATIONS

International Search Report PCT/FI2014/050294 dated Oct. 15, 2014.

*Primary Examiner* — Y M. Lee
(74) *Attorney, Agent, or Firm* — Young & Thompson

(57) ABSTRACT

A low-beam headlight element includes a lens (301) for modifying the distribution pattern of light penetrating the lens, and a reflector element (302) including a first end having a place for a light source (303) and a second end having an opening constituting a passage for the light penetrating the lens. The thickness of the lens is shaped to decrease more strongly towards a first edge (303) of the lens than towards an opposite second edge of lens so as to provide more refractivity on a first area of the lens abutting on the first edge than on a second area of the lens abutting on the second edge. The refractivity on the first area produces a cutoff line in a resulting light distribution pattern. Hence, for achieving a cutoff line meandering in a desired way, there is no need for a screen element which converts light into heat.

7 Claims, 12 Drawing Sheets

(52) U.S. Cl.
CPC ............ F21S 48/1394 (2013.01); G02B 3/00 (2013.01); *F21S 48/125* (2013.01); *F21S 48/1216* (2013.01)

(58) Field of Classification Search
CPC ............... F21S 48/1208; F21S 48/1216; F21S 48/1225; F21S 48/125; F21S 48/13; F21S 48/1347; F21S 48/1352; F21S 47/1364; G02B 3/00; G02B 3/0043
See application file for complete search history.

(56) References Cited

U.S. PATENT DOCUMENTS

| | | | |
|---|---|---|---|
| 4,771,372 A * | 9/1988 | Litetar et al. ....... | F21S 48/1258 362/189 |
| 2002/0181246 A1 | 12/2002 | Takada et al. | |
| 2009/0213608 A1* | 8/2009 | Mozaffari-Afshar | F21S 48/1258 362/520 |

FOREIGN PATENT DOCUMENTS

| | | |
|---|---|---|
| EP | 1686309 | 8/2006 |
| EP | 2280214 | 2/2011 |
| FR | 797919 | 5/1936 |

\* cited by examiner

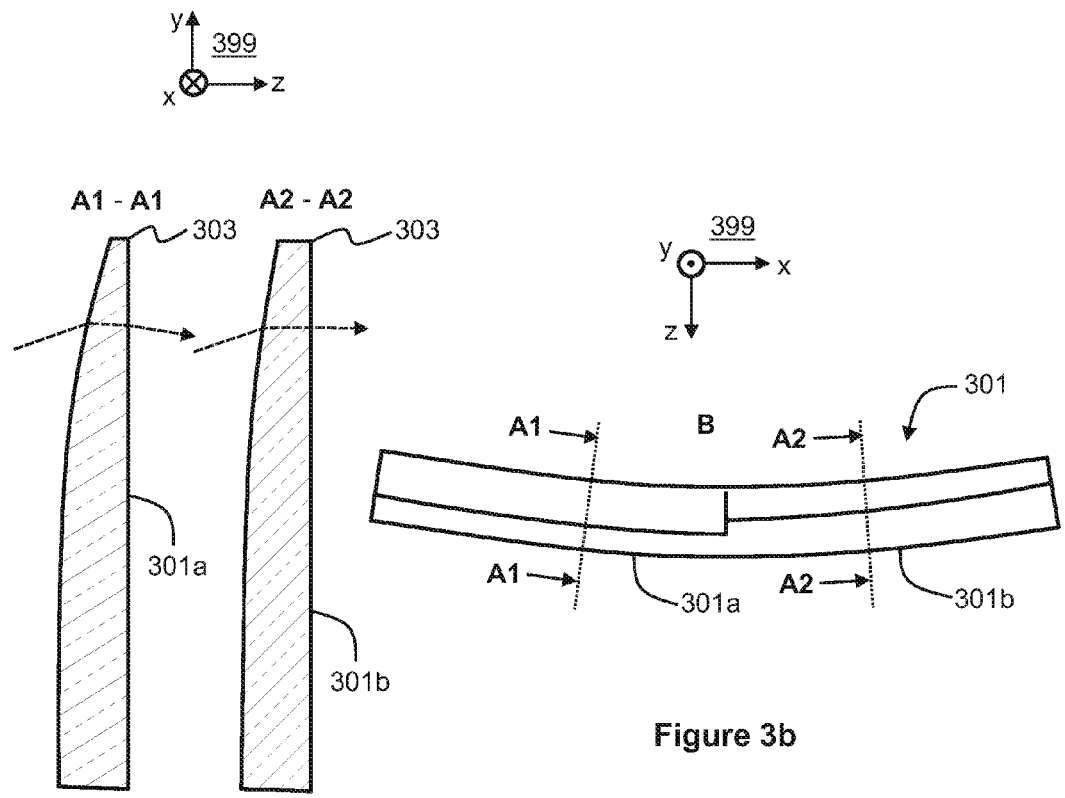
Figure 3c
Figure 3b
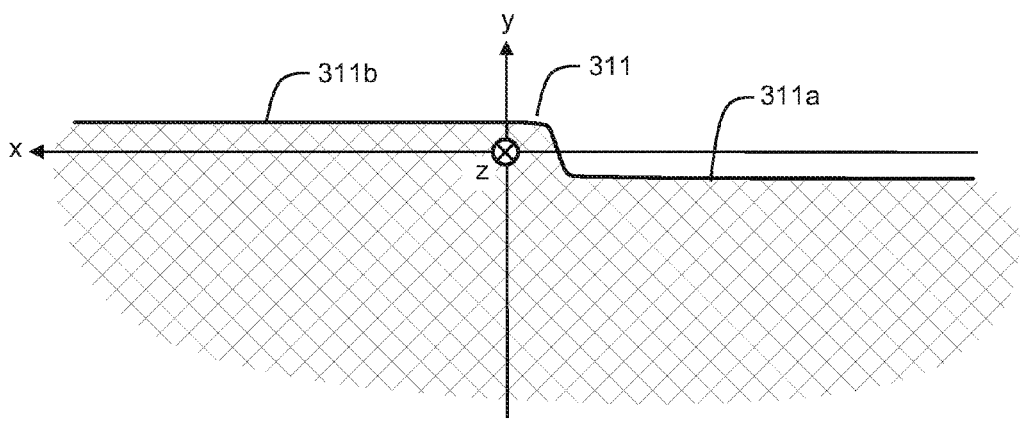
Figure 3d

LOW-BEAM HEADLIGHT ELEMENT FOR A VEHICLE

FIELD OF THE INVENTION

The invention relates generally to illuminating engineering. More particularly, the invention relates to low-beam headlight element for a vehicle.

BACKGROUND

Operation of a low-beam headlight element of a vehicle is regulated by rules and limitations concerning the light distribution pattern produced by the low-beam head-light element. The operation of a low-beam headlight element is illustrated with the aid of FIGS. 1a, 1b, and 1c, where FIG. 1a shows a side view of a low-beam head-light element 100, FIG. 1b shows a top view of the low-beam headlight element, and FIG. 1c shows a schematic illustration of a light distribution pattern which is formed on a virtual screen 110 provided in a forward position from the low-beam headlight element. The virtual screen 110 is parallel with the xy-plane of a coordinate system 199, and the light distribution pattern is schematically presented as a cross-hatched area in FIG. 1c. In the exemplifying case illustrated in FIGS. 1a-1c, the low-beam headlight element 100 is suitable for left-hand traffic. The light distribution pattern is required to have a cutoff line 111 above which the intensity of the light should be sufficiently low in order to avoid glaring drivers of oncoming vehicles. Concerning the cutoff line 111, there can be for example rules which define allowed ranges for angles α and β illustrated in FIGS. 1a-1c. For example, the angle α can be required to be on the range from −0.5 degrees to +0.5 degrees and the angle β can be required to be on the range from −1.5 degrees to +1.5 degrees.

A typical arrangement for producing the cutoff line 111 in the light distribution pattern is to provide the low-beam headlight element 100 with a screen element which cuts out a portion of the light that would otherwise fall on the region above the cutoff line 111. An inherent inconvenience related to this approach is that the screen element reduces the amount of light radiated by the low-beam headlight element. Furthermore, the screen element converts at least part of the screened light into heat and thus warms up the low-beam headlight element.

SUMMARY

The following presents a simplified summary in order to provide a basic understanding of some aspects of various embodiments of the invention. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new low-beam headlight element for a vehicle. A low-beam headlight element according to the invention comprises:
  a lens for modifying the distribution pattern of light penetrating the lens, and
  a reflector element comprising a first end having a place for a light source and a second end having an opening constituting a passage for the light penetrating the lens.

The thickness of the lens is shaped to decrease more strongly towards a first edge of the lens than towards an opposite second edge of the lens so as to provide more refractivity on a first area of the lens abutting on the first edge of the lens than on a second area of the lens abutting on the second edge of the lens. The refractivity on the first area of the lens refracts the light so that a desired cutoff line is produced in the distribution pattern of the light penetrating the lens and the refractivity producing the cutoff line is changing along the first edge of the lens so as to make the cutoff line to curve in a desired way. The first area of the lens includes a first portion configured to produce a first part of the cutoff line and a second portion configured to produce a second part of the cutoff line. The thickness of the lens has a stepwise change between the first portion and the second portion of the lens and on the first edge of the lens so that the refractivity providing the cutoff line is stronger on the first portion than on the second portion to cause the cutoff line to have a stepwise change between the first and second parts of the cutoff line.

Hence, for achieving the cutoff line, there is no need for screening the light emitted by the light source and thus the amount of the light radiated by the low-beam head-light element can be greater.

In accordance with the invention, there is provided also a new vehicle that comprises at least one low-beam headlight element according to the invention. The low-beam headlight element is positioned in the vehicle so that the direction in which the thickness of the lens decreases towards the first edge of the lens is upwards when the vehicle is on a horizontal surface in the normal operating position of the vehicle. In this document, the term "vehicle" can apply to any transportation mode such as, for example, an automobile, a motor cycle, a mobile working machine, a railcar, etc.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

The exemplifying and non-limiting embodiments of the invention and their advantages are explained in greater detail below with reference to the accompanying drawings, in which:

FIGS. 1a, 1b, and 1c have already been explained in the Background-section of this document.

DESCRIPTION OF EXEMPLIFYING EMBODIMENTS

Figure 1A:
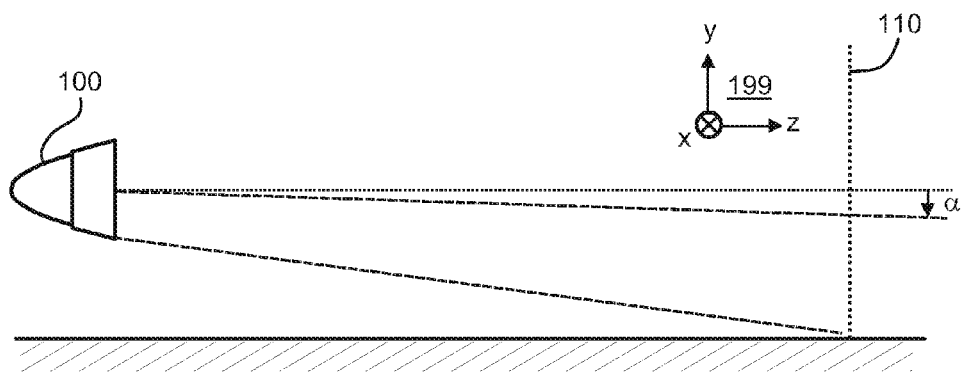
FIGS. 1a, 1b, and 1c illustrate the operation of a low-beam headlight element according to the prior art.
Figure 1B:
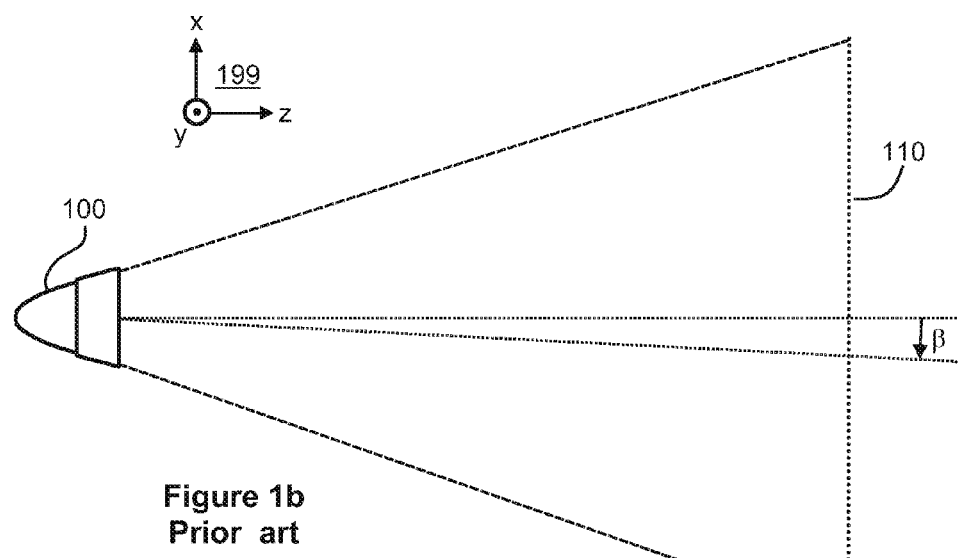
Figure 1C:
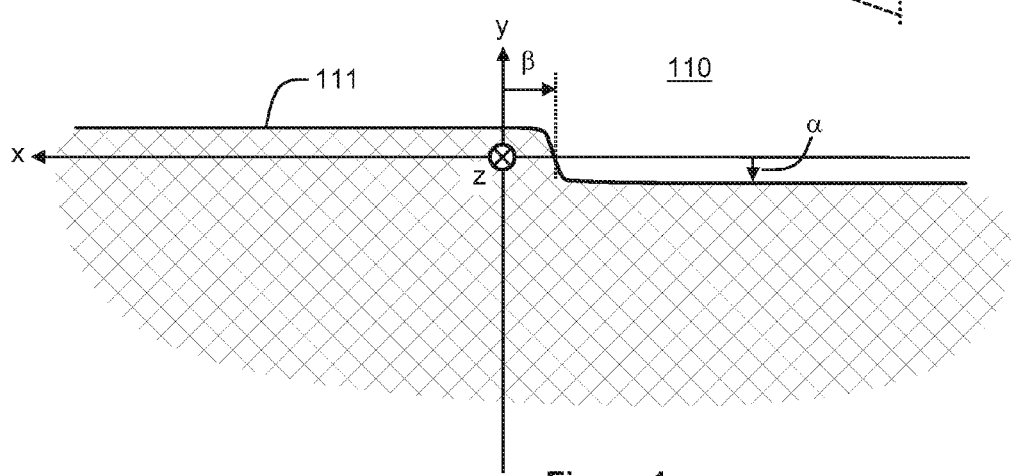
Figure 2A:
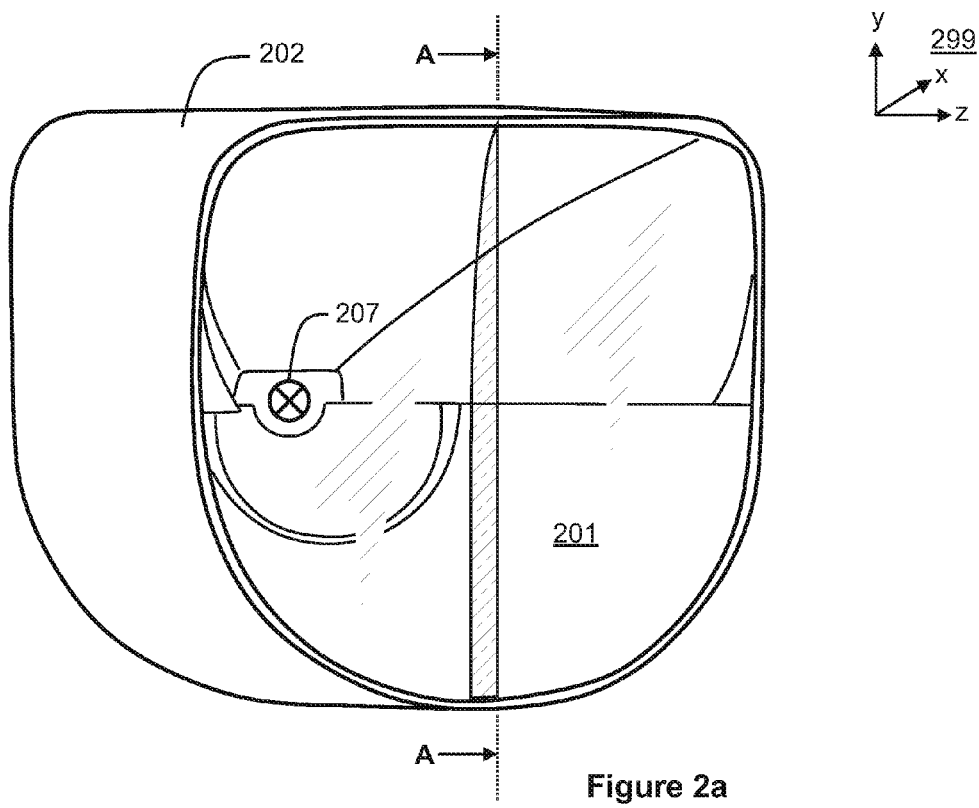
FIGS. 2a and 2b illustrate an exemplifying low-beam headlight element according to the prior art.
Figure 2B:
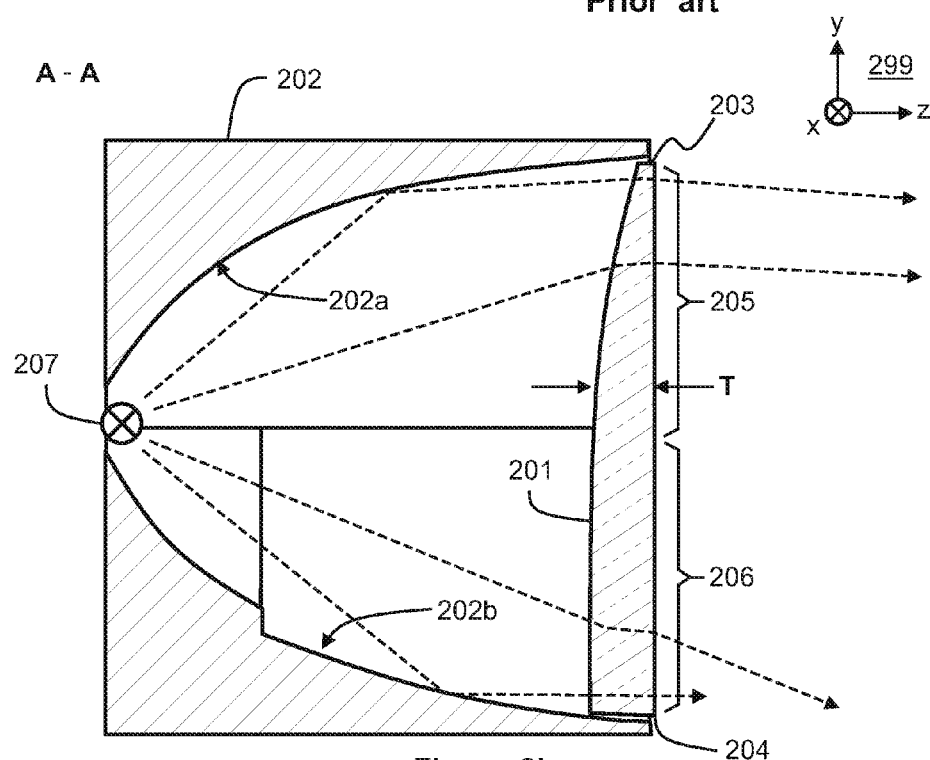
Figure 2C:
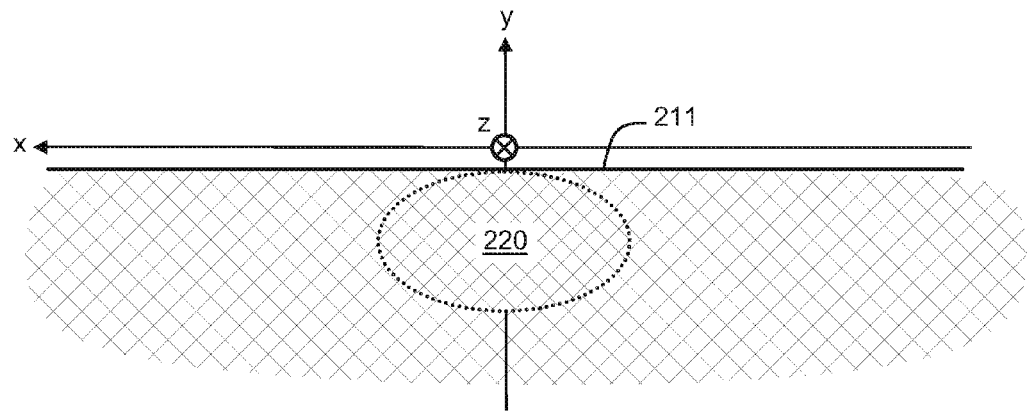
FIG. 2c shows a schematic illustration of the light distribution pattern formed by the low-beam headlight element illustrated in FIGS. 2a and 2b, FIGS. 3a, 3b, and 3c illustrate a low-beam headlight element according to an exemplifying embodiment of the invention.

FIG. 2a shows a perspective view of an exemplifying low-beam headlight element according to the prior art so as to provide a prelude to descriptions of exemplifying embodiments of the invention. FIG. 2b shows a view of a section taken along the line A-A shown in FIG. 2a. The section plane is parallel with the yz-plane of a coordinate system 299. The low-beam headlight element comprises a lens 201 for modifying the distribution pattern of light penetrating the lens. The section surface of the lens shown in FIG. 2b is shown also in FIG. 2a for the sake of illustration. The low-beam headlight element comprises a reflector element 202 comprising a first end having a place for a light source 207 and a second end having an opening constituting a passage for the light penetrating the lens 201. In FIG. 2b, some of the light beams emitted by the light source 207 are depicted with dashed-line arrows. The light source can be, for example but not necessarily, a light emitting diode "LED", a filament lamp, or a gas-discharge lamp. Electrical wires connected to the light source 207 are not shown in FIGS. 2a and 2b. The reflector element 202 can be made of for example metal or plastic having metal coating on surfaces which are wanted to be reflective. The metal can be for example aluminum or silver. As illustrated in FIG. 2b, the thickness T of the lens 201 is shaped to decrease more strongly towards a first edge 203 of the lens than towards an opposite second edge 204 of lens so as to provide more refractivity on a first area 205 of the lens abutting on the first edge of the lens than on a second area 206 of the lens abutting on the second edge of the lens. In the exemplifying case illustrated in FIGS. 2a and 2b, the thickness T of the lens is substantially constant on the second area 206 of the lens, i.e. there is no substantial refractivity on the second area 206 of the lens. As illustrated in FIG. 2b, the refractivity on the first area 205 of the lens refracts light beams penetrating the first area of the lens so that a cutoff line is produced in the light distribution pattern which is formed on a virtual screen provided in a forward position from the low-beam headlight element. The light distribution pattern is schematically presented as a cross-hatched area in FIG. 2c, where the cutoff line is denoted with the reference number 211. When using the low-beam headlight element in a vehicle, the intensity of the light above the cut-off line 211 is sufficiently low in order to avoid glaring drivers of oncoming vehicles.

The reflector element 202 comprises a first reflector surface 202a for reflecting light to the first area 205 of the lens. The first reflector surface 202a extends from the place for the light source 207 to the first edge 203 of the lens. The first reflector surface 202a is advantageously substantially straight in the sideward direction of the reflector element, i.e. in the x-direction of the coordinate system 299, so as make the light distribution pattern sufficiently wide in the x-direction. In some cases, the first reflector surface 202a can be roughened, grooved, or provided with undulations for smoothing the light distribution pattern. The reflector element comprises a second reflector surface 202b for reflecting light to the second area 206 of the lens. The second reflector 202b surface extends to the second edge 204 of the lens and is advantageously concavely curved in the sideward direction of the reflector element, i.e. in the x-direction, so as to direct light to a region 220 shown in FIG. 2c. Furthermore, in addition to the reflective surfaces 202a and 202b, the reflector element comprises other reflector surfaces for directing light to the lens 201. Operation of different reflective surfaces will be illustrated later in this document with the aid of FIGS. 5a-5f.

Figure 3A:
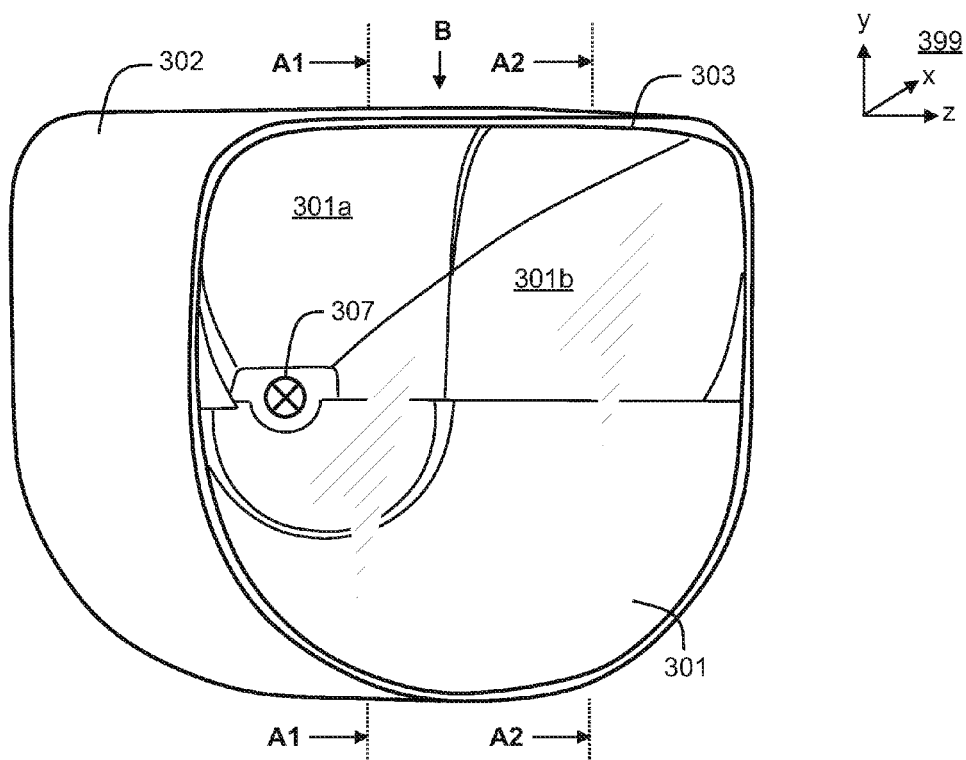
FIG. 3d shows a schematic illustration of the light distribution pattern formed by the low-beam headlight element illustrated in FIGS. 3a-3c, FIGS. 4a and 4b illustrate a lens of a low-beam headlight element according to an exemplifying embodiment of the invention.

FIG. 3a shows a perspective view of a low-beam headlight element according to an exemplifying embodiment of the invention. The low-beam headlight element comprises a lens 301 for modifying the distribution pattern of light penetrating the lens. The low-beam headlight element comprises a reflector element 302 comprising a first end having a place for a light source 307 and a second end having an opening constituting a passage for the light penetrating the lens 301. FIG. 3b shows the lens 301 seen from above along an arrow B shown in FIG. 3a. FIG. 3c shows a view of a section taken from the lens 301 along the line A1-A1 shown in FIGS. 3a and 3b, and a view of another section taken from the lens 301 along the line A2-A2 shown in FIGS. 3a and 3b. FIG. 3d shows a schematic illustration of the light distribution pattern which is formed on a virtual screen provided in a forward position from the low-beam headlight element. The virtual screen is parallel with the xy-plane of a coordinate system 399, and the light distribution pattern is schematically presented as a cross-hatched area in FIG. 3d. The light distribution pattern has a cutoff line 311 above which the intensity of the light is low. In the exemplifying case illustrated in FIGS. 3a-3d, the low-beam headlight element is suitable for left-hand traffic. The lens 301 comprises a first portion 301a producing a first part 311a of the cutoff line and a second portion 301b producing a second part 311b of the cutoff line so that the refractivity providing the cutoff line is stronger on the first portion 301a than on the second portion 301b so as to make the first and second parts 311a and 311b of the cutoff line to be mutually different as illustrated in FIG. 3d. The fact that the refractivity providing the cutoff line is stronger on the first portion 301a than on the second portion 301b is illustrated in FIG. 3b which shows that an exemplifying light beam penetrating the first portion 301a of the lens is more strongly refracted than another exemplifying light beam penetrating the second portion 301b of the lens. The light beams are depicted as dashed line arrows in FIG. 3c.

In the exemplifying low-beam headlight element illustrated in FIGS. 3a-3c, the lens 301 is shaped to have curvature in a direction that is perpendicular to a direction in which the thickness of the lens decreases towards a first edge 303 of the lens so that a concave side of the curvature faces towards the reflector element 302. The curvature of the lens is illustrated in FIG. 3b and the above-mentioned direction in which the lens 301 has the curvature is the x-direction of the coordinate system 399 and the above-mentioned direction in which the thickness of the lens decreases towards the first edge of the lens is the y-direction of the coordinate system 399.

Figure 4A:
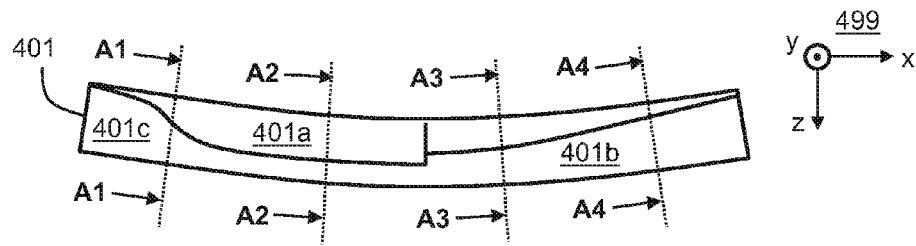
FIG. 4c shows a schematic illustration of the light distribution pattern formed by the low-beam headlight element.
Figure 4B:
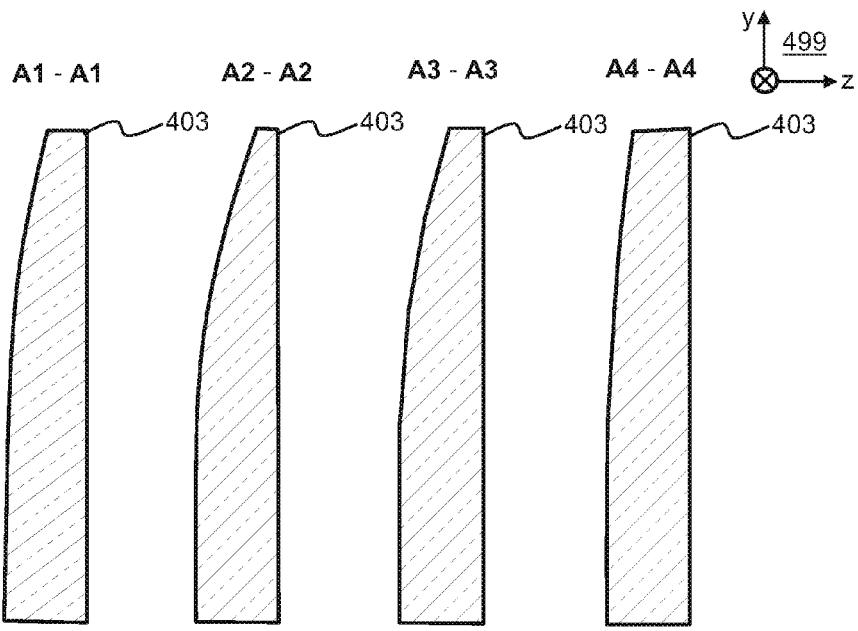
Figure 4C:
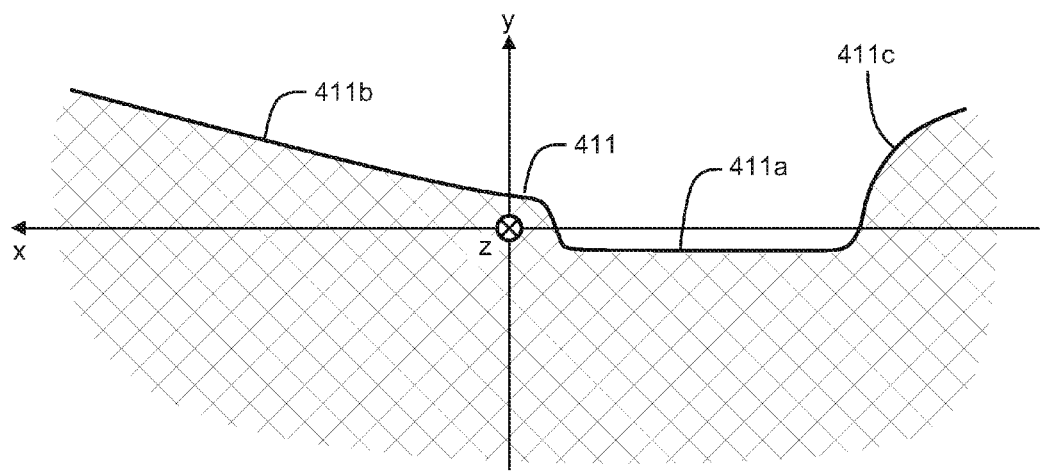

FIG. 4a shows a lens 401 of a low-beam headlight element according to an exemplifying embodiment of the invention. FIG. 4a shows the lens 401 in the same way as FIG. 3b shows the lens 301. FIG. 4b shows views of sections taken from the lens 401 along the lines A1-A1, A2-A2, A3-A3, and A4-A4 shown in FIG. 4a. The reflector element of the low-beam headlight element is not shown in FIGS. 4a and 4b but the reflector element can be for example similar to the reflector element 302 shown in FIG. 3a. FIG. 4c shows a schematic illustration of the light distribution pattern which is formed on a virtual screen provided in a forward position from the low-beam headlight element. The virtual screen is parallel with the xy-plane of a coordinate system 499, and the light distribution pattern is schematically presented as a cross-hatched area in FIG. 4c. The light distribution pattern has a cutoff line 411 above which the intensity of the light is low. In the exemplifying case illustrated in FIGS. 4a-4c, the low-beam headlight element is suitable for left-hand traffic.

As illustrated in FIGS. 4a and 4b, the refractivity of the lens 401 producing the cutoff line 411 is changing along the first edge 403 of the lens 401 so as to make the cutoff line to meander. In this exemplifying case, the refractivity producing the cutoff line is at its smallest at the ends of the first edge 403 of the lens 401 so as to make the cutoff line to have elevations at the ends of the cutoff line as illustrated in FIG. 4c. FIG. 4a illustrates portions 401a, 401b, and 401c of the lens 401 which form parts 411a, 411b, and 411c of the cutoff line shown in FIG. 4c. The portion 401a of the lens forms the part 411a of the cutoff line, the portion 401b of the lens forms the part 411b of the cutoff line, and the portion 401c of the lens forms the part 411c of the cutoff line.

Figure 5A:
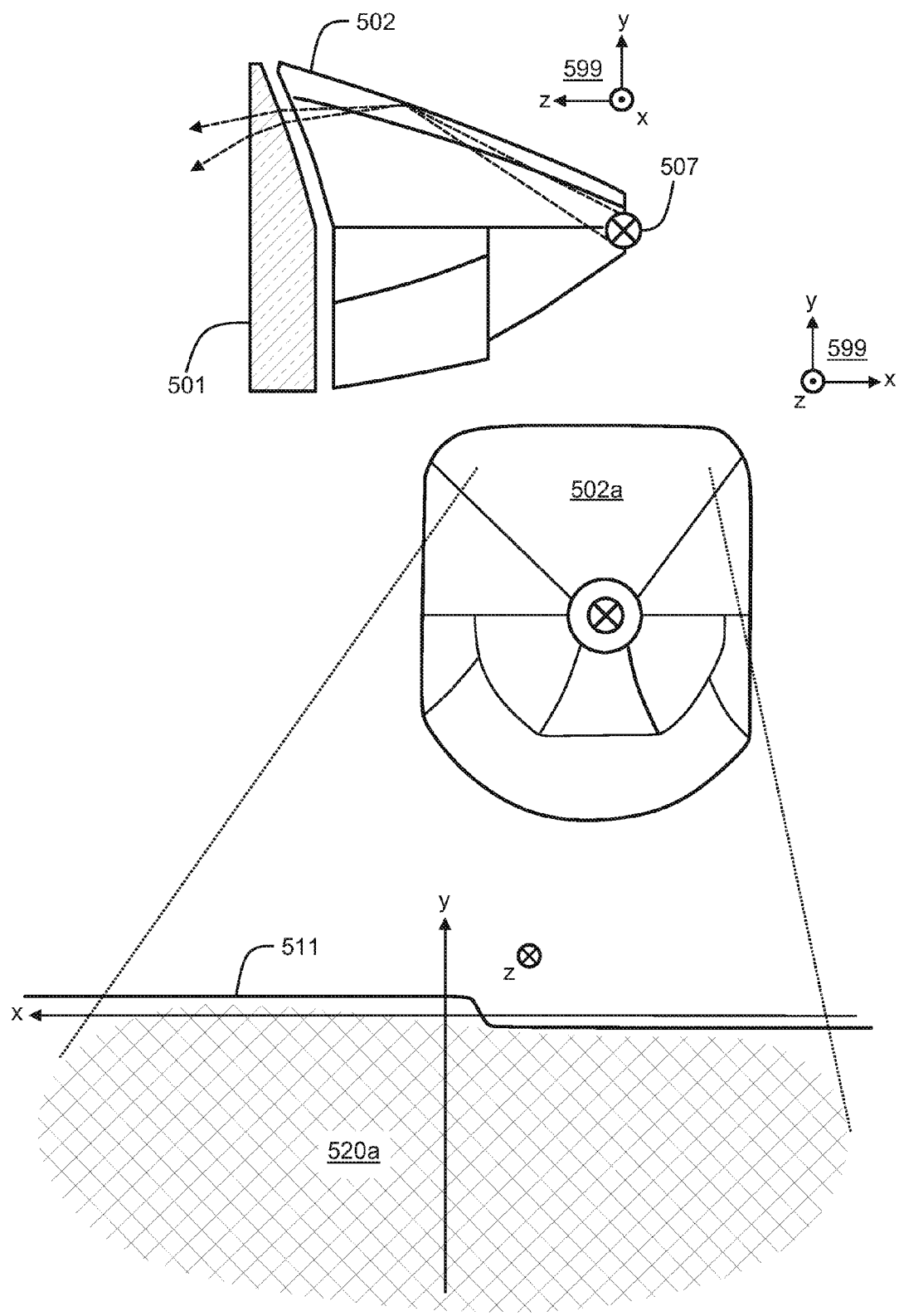
FIGS. 5a, 5b, 5c, 5d, 5e, and 5f illustrate the operation of a low-beam headlight element according to an exemplifying embodiment of the invention.
Figure 5B:
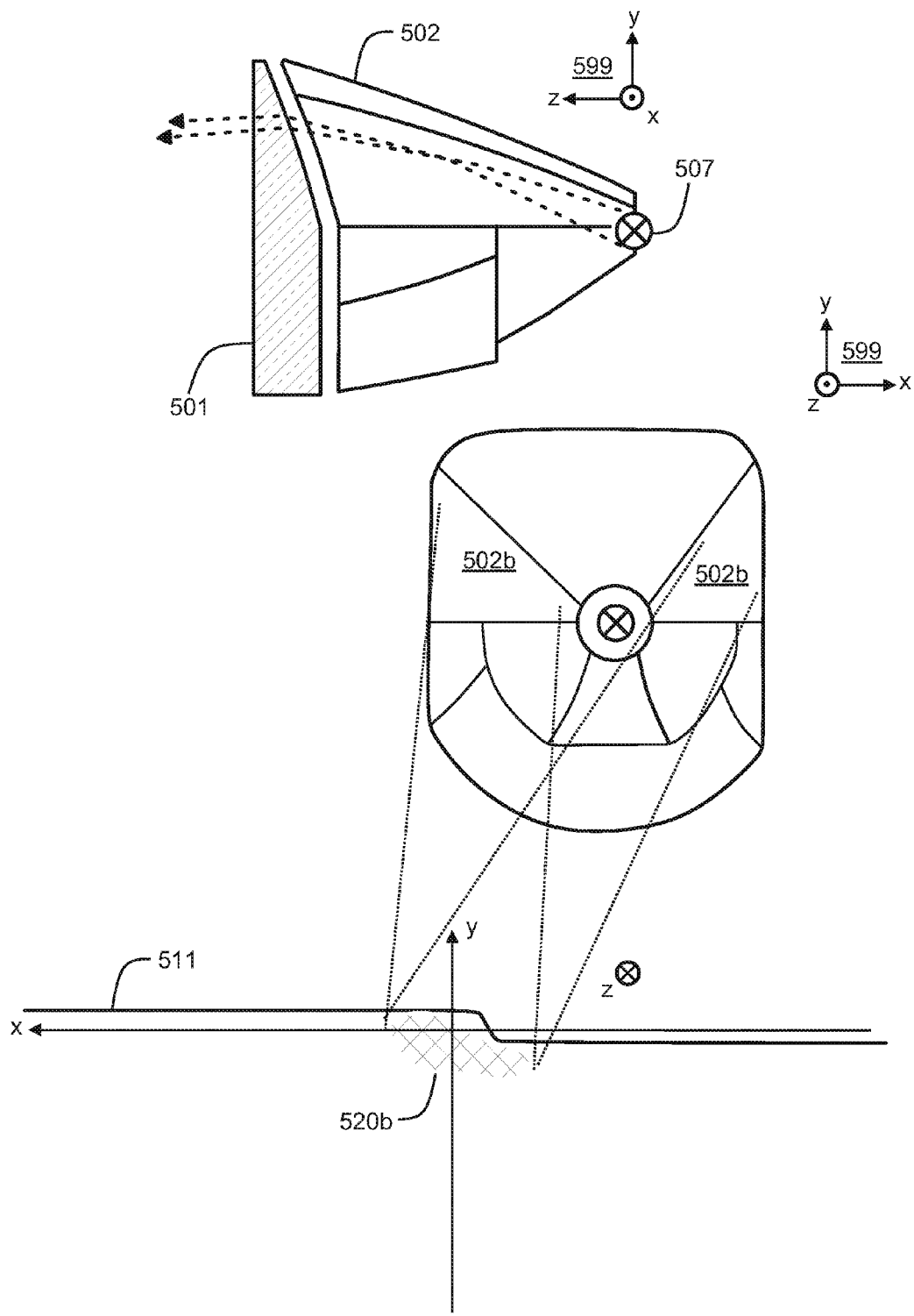
Figure 5C:
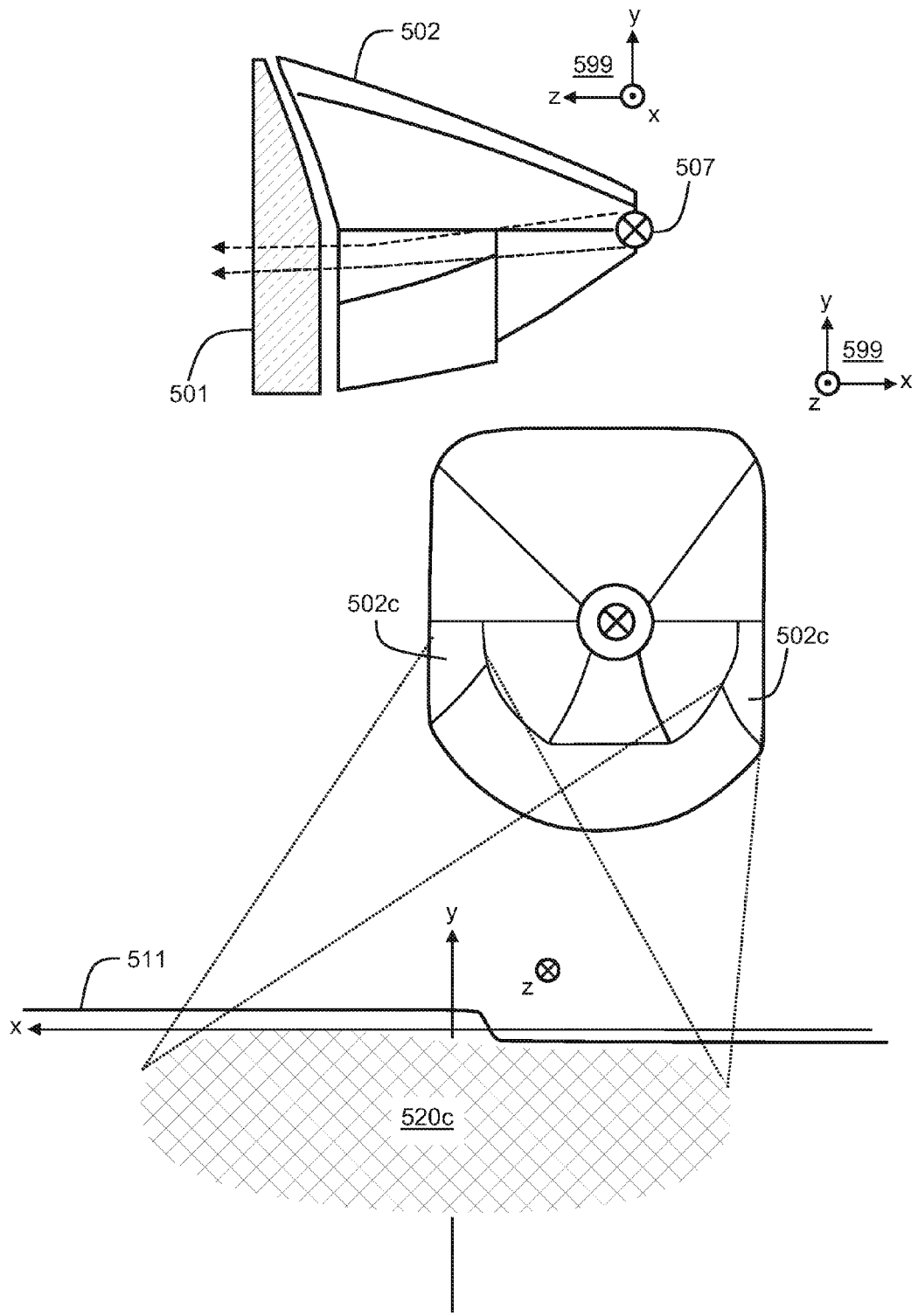
Figure 5D:
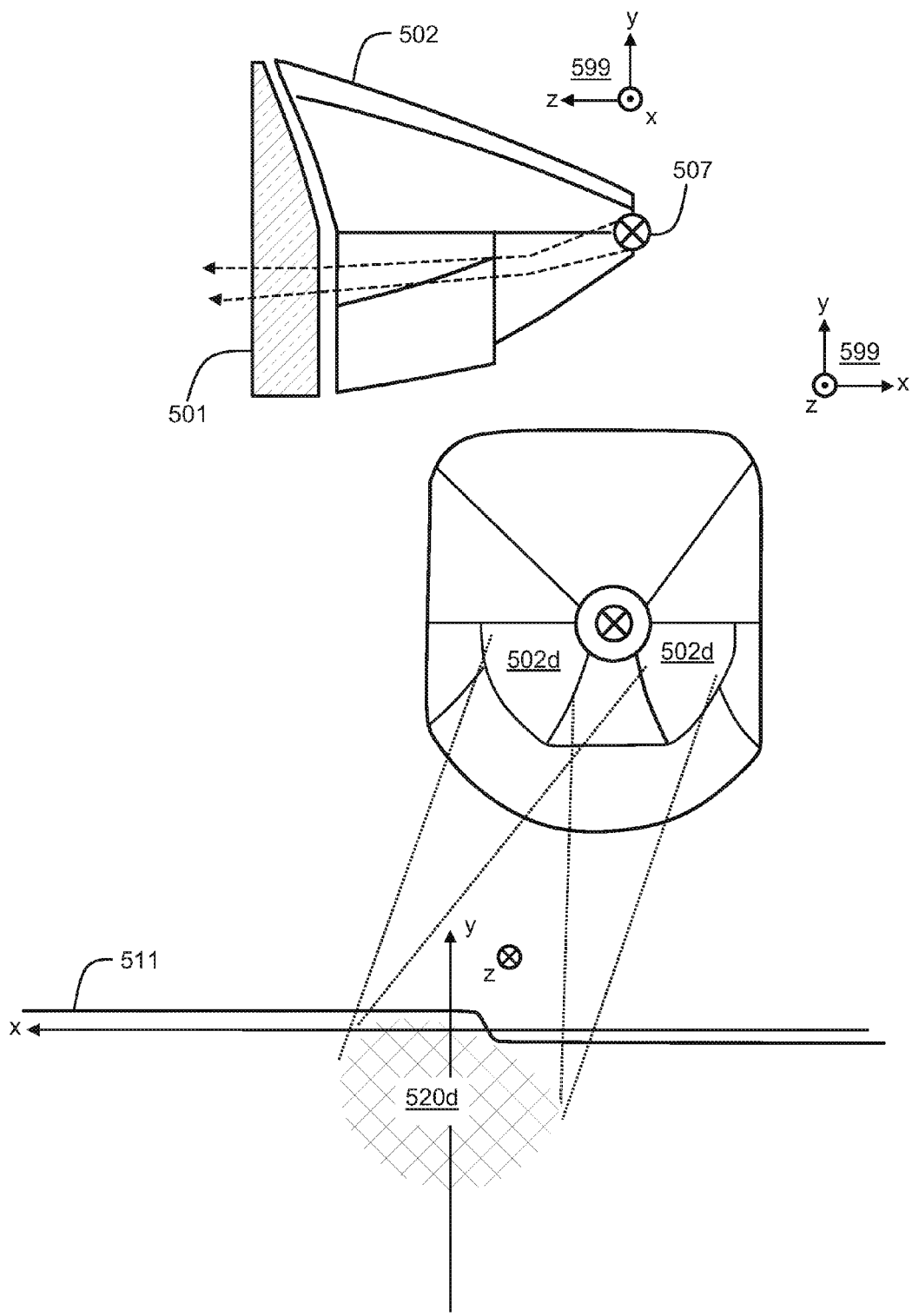
Figure 5E:
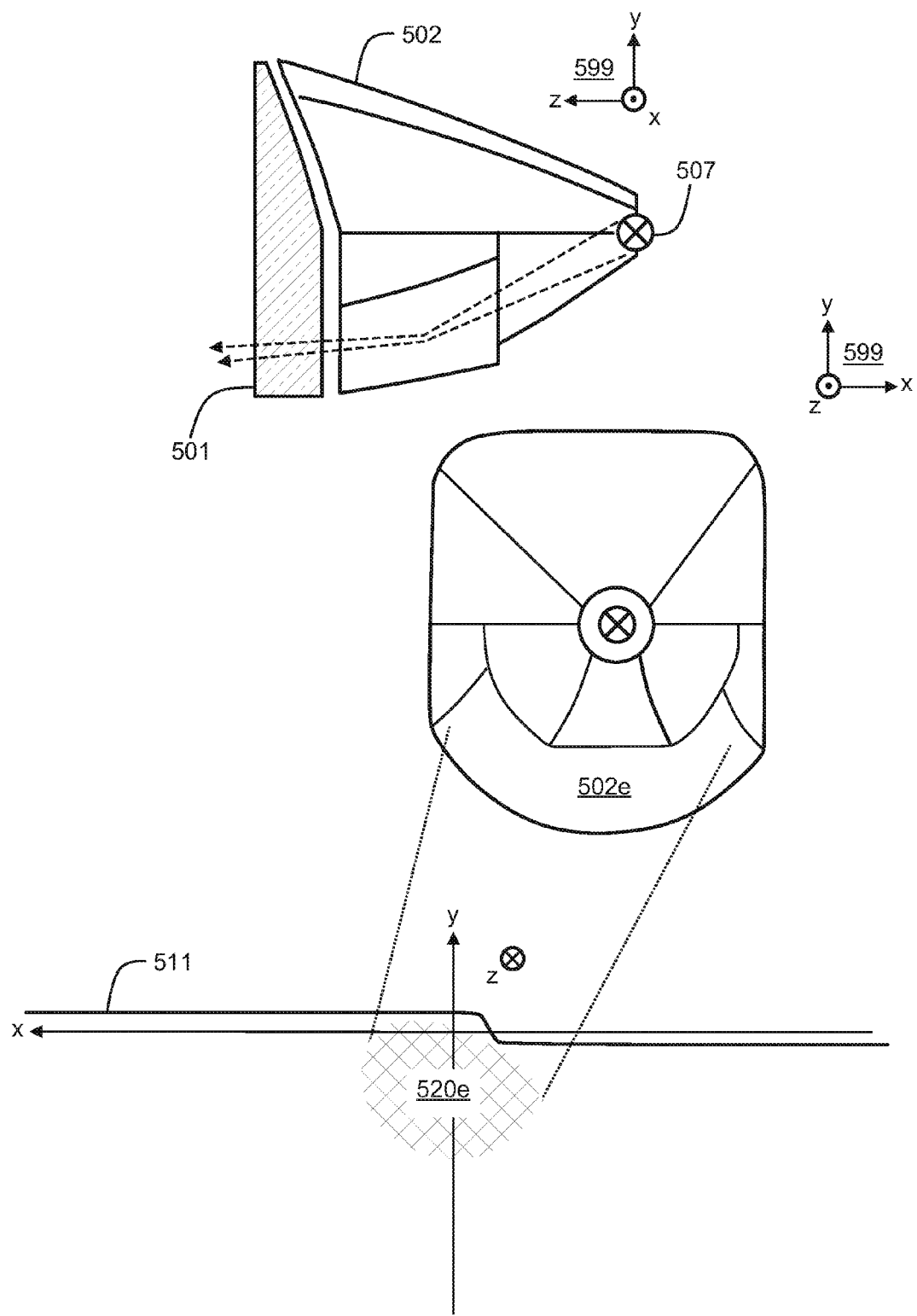
Figure 5F:
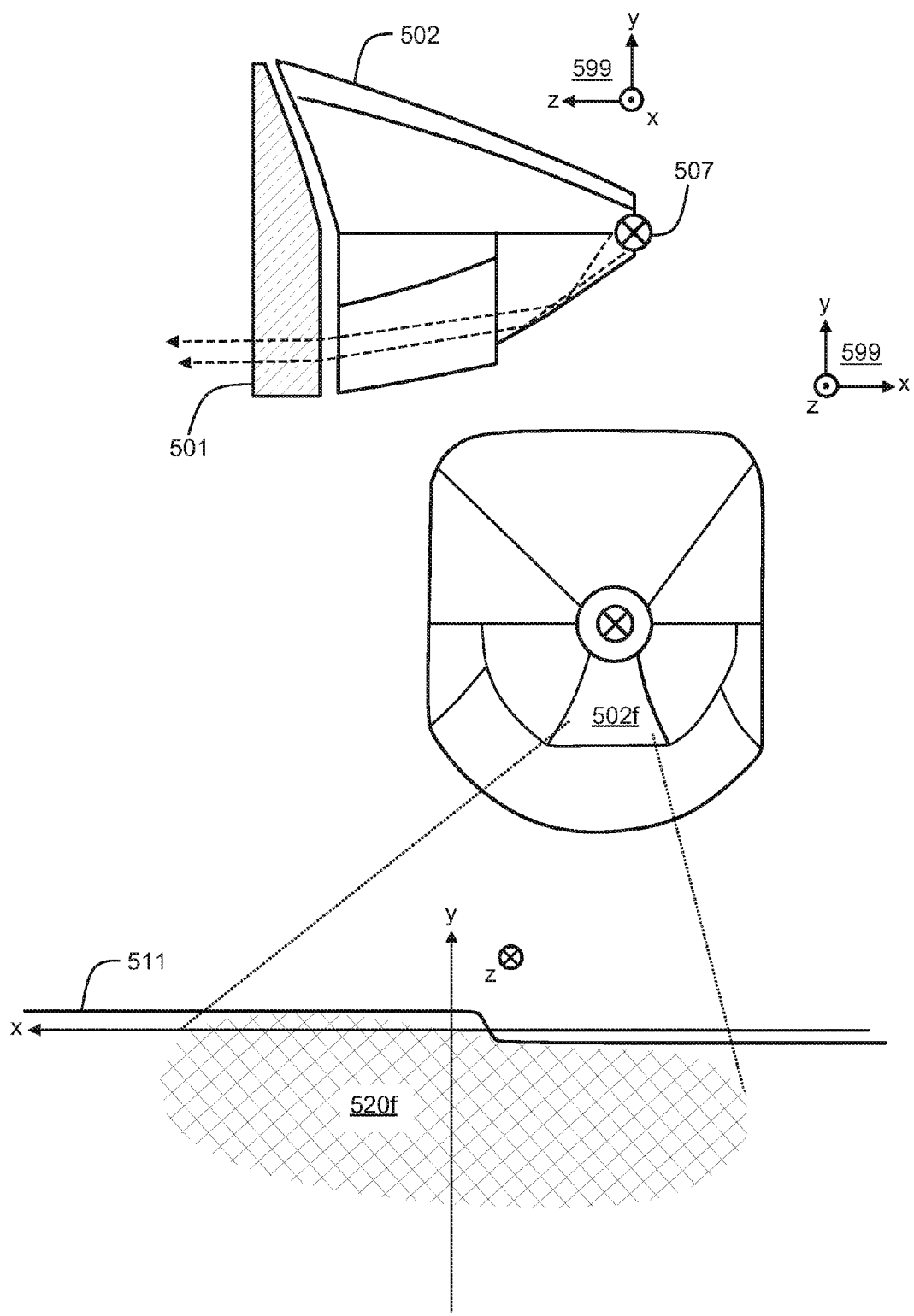

FIGS. 5a, 5b, 5c, 5d, 5e, and 5f illustrate the operation of a low-beam headlight element according to an exemplifying embodiment of the invention. The low-beam headlight element comprises a lens 501 and a reflector element 502 comprising a first end having a place for a light source 507 and a second end having an opening constituting a passage for the light penetrating the lens. The lens 501 can be such as for example the lens 301 illustrated in FIGS. 3b and 3c. FIGS. 5a-5f show schematic illustrations of components 520a, 520b, 520c, 520d, 520e, and 520f of the light distribution pattern. The components of the light distribution pattern are formed on a virtual screen that is provided in a forward position from the low-beam headlight element and is parallel with the xy-plane of a coordinate system 599. The components of the light distribution pattern are schematically presented as cross-hatched areas in FIGS. 5a-5f. As illustrated in FIG. 5a, the light reflected by a reflective surface 502a forms the component 520a of the light distribution pattern. As illustrated in FIG. 5b, the light reflected by reflective surfaces 502b forms the component 520b of the light distribution pattern. As illustrated in FIG. 5c, the light reflected by reflective surfaces 502c forms the component 520c of the light distribution pattern. As illustrated in FIG. 5d, the light reflected by reflective surfaces 502d forms the component 520d of the light distribution pattern. As illustrated in FIG. 5e, the light reflected by a reflective surface 502e forms the component 520e of the light distribution pattern. As illustrated in FIG. 5f, the light reflected by a reflective surface 502f forms the component 520f of the light distribution pattern. The total light distribution pattern is a superposition of the components 520a-520f together with the distribution pattern of the light which propagates directly from the light source 507 through the lens 501 without reflections. Furthermore, the desired cutoff line 511 of the total light distribution pattern is shown in FIGS. 5a-5f.

Figure 6:
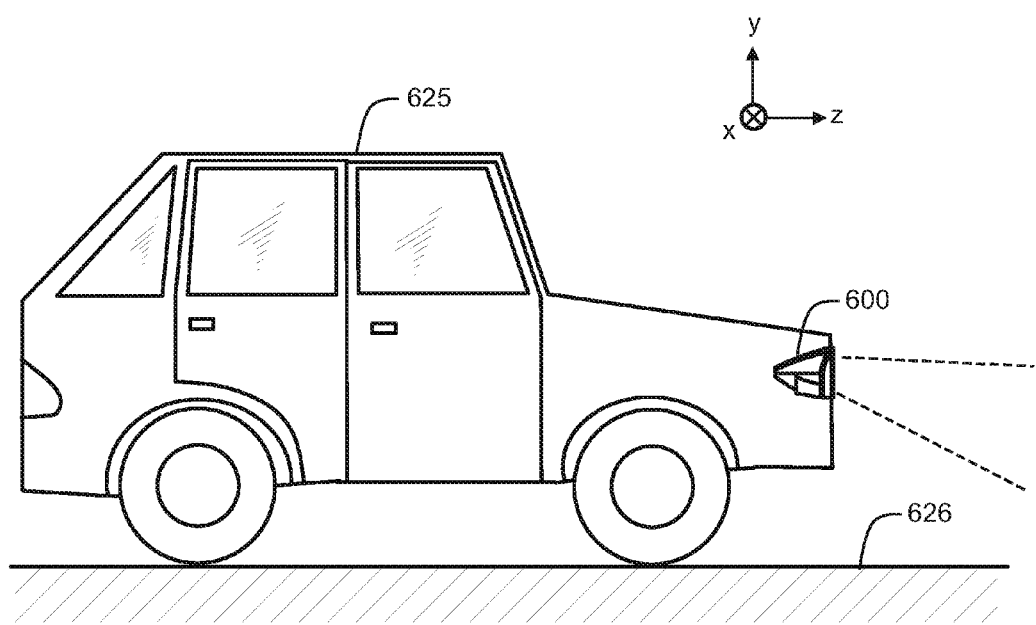
FIG. 6 shows a schematic illustration of a vehicle according to an exemplifying embodiment of the invention.

FIG. 6 shows a schematic illustration of a vehicle 625 according to an exemplifying embodiment of the invention. The vehicle comprises low-beam headlight elements according to an embodiment of the invention. One of the low-beam headlight elements is denoted with a reference number 600. Each of the low-beam headlight elements is positioned in the vehicle 625 so that the direction in which the thickness of the lens of the low-beam headlight element decreases towards the first edge of the lens is upwards when the vehicle is on a horizontal surface 626 in the normal operating position of the vehicle.

The specific examples provided in the description given above should not be construed as limiting the scope and/or the applicability of the appended claims. The above-presented low-beam headlight elements according to exemplifying embodiments of the invention are suitable for left-hand traffic. Naturally, the same principles are directly applicable to low-beam headlight elements for right-hand traffic.

What is claimed is:

1. A low-beam headlight element for a vehicle, the low-beam headlight element comprising:
a lens configured to modify a distribution pattern of light penetrating the lens; and
a reflector element comprising a first end having a place for a light source and a second end having an opening constituting a passage for the light penetrating the lens,
wherein a thickness of the lens is shaped to decrease more strongly towards a first edge of the lens than towards an opposite second edge of the lens to provide more refractivity on a first area of the lens abutting on the first edge of the lens than on a second area of the lens abutting on the second edge of the lens,
the refractivity on the first area of the lens produces a cutoff line in the distribution pattern of the light penetrating the lens, the refractivity producing the cutoff line changing along the first edge of the lens to cause the cutoff line to curve, and
the lens comprises a first portion configured to produce a first part of the cutoff line and a second portion configured to produce a second part of the cutoff line, the thickness of the lens having a stepwise change between the first portion and the second portion of the lens and on the first edge of the lens so that the refractivity providing the cutoff line is stronger on the first portion than on the second portion to cause the cutoff line to have a stepwise change between the first and second parts of the cutoff line.

2. The low-beam headlight element according to claim 1, wherein the refractivity producing the cutoff line is at its smallest at the ends of the first edge of the lens to cause the cutoff line have elevations at the ends of the cutoff line.

3. The low-beam headlight element according to claim 1, wherein the lens is shaped to have curvature in a direction that is perpendicular to a direction in which the thickness decreases towards the first edge of the lens so that a side of the lens which is concave in accordance with the curvature faces towards the reflector element.

4. The low-beam headlight element according to claim 1, wherein the reflector element comprises a first reflector surface for reflecting light to the first area of the lens, the first reflector surface extending from the place for the light source to the first edge of the lens and being substantially straight in a sideward direction of the reflector element.

5. The low-beam headlight element according to claim 4, wherein the reflector element comprises a second reflector surface for reflecting light to the second area of the lens, the second reflector surface extending to the second edge of the lens and being shaped to have a curvature in the sideward direction of the reflector element so that the second reflector surface is concave in accordance with the curvature.

6. A vehicle comprising:
at least one low-beam headlight element comprising:
a lens configured to modify a distribution pattern of light penetrating the lens, and
a reflector element comprising a first end having a place for a light source and a second end having an opening constituting a passage for the light penetrating the lens,
wherein a thickness of the lens is shaped to decrease more strongly towards a first edge of the lens than towards an opposite second edge of the lens to provide more refractivity on a first area of the lens abutting on the first edge of the lens than on a second area of the lens abutting on the second edge of the lens,
the refractivity on the first area of the lens produces a cutoff line in the distribution pattern of the light penetrating the lens, the refractivity producing the cutoff line changing along the first edge of the lens to cause the cutoff line to curve,
the first area of the lens comprises a first portion configured to produce a first part of the cutoff line and a second portion configured to produce a second part of the cutoff line, the thickness of the lens having a stepwise change between the first portion and the second portion of the lens and on the first edge of the lens so that the refractivity providing the cutoff line is stronger on the first portion than on the second portion to cause the cutoff line to have a stepwise change between the first and second parts of the cutoff line, and
wherein a direction in which the thickness of the lens decreases towards the first edge of the lens is upwards when the vehicle is on a horizontal surface in an operating position of the vehicle.

7. The vehicle according to claim 6, wherein the vehicle is one of the following: an automobile, a motor cycle, a mobile working machine, and a railcar.

* * * * *